(12) United States Patent
Michaud-Bernlochner et al.

(10) Patent No.: US 12,297,110 B2
(45) Date of Patent: May 13, 2025

(54) PROCESS FOR PREPARING A POROUS CARBON MATERIAL AND A POROUS CARBON MATERIAL OBTAINABLE BY THIS PROCESS

(71) Applicant: HERAEUS BATTERY TECHNOLOGY GMBH, Hanau (DE)

(72) Inventors: Julie Michaud-Bernlochner, Hanau (DE); Andreas Kuhn, Hanau (DE); Evgeniia Komarova, Hanau (DE); Benjamin Krüner, Hanau (DE); Jörg Becker, Hanau (DE)

(73) Assignee: HERAEUS BATTERY TECHNOLOGY GMBH, Hanau (DE)

( * ) Notice: Subject to any disclaimer, the term of this patent is extended or adjusted under 35 U.S.C. 154(b) by 710 days.

(21) Appl. No.: 17/436,315

(22) PCT Filed: Mar. 19, 2020

(86) PCT No.: PCT/EP2020/057620
§ 371 (c)(1),
(2) Date: Sep. 3, 2021

(87) PCT Pub. No.: WO2020/200811
PCT Pub. Date: Oct. 8, 2020

(65) Prior Publication Data
US 2022/0169510 A1   Jun. 2, 2022

(30) Foreign Application Priority Data
Apr. 2, 2019   (EP) ..................................... 19166722

(51) Int. Cl.
*C01B 32/05* (2017.01)

(52) U.S. Cl.
CPC .......... *C01B 32/05* (2017.08); *C01P 2006/14* (2013.01); *C01P 2006/16* (2013.01)

(58) Field of Classification Search
CPC ......... C01B 32/05; C01B 32/15; C01B 32/00; C01P 2006/14; C01P 2006/16; C01P 2006/11; C01P 2006/17; C04B 35/522; C04B 38/0022; C04B 2111/00853; C04B 2235/48; C04B 2235/656; C04B 2235/6562; C04B 2235/6565; C04B 2235/6584; C04B 35/524
See application file for complete search history.

(56) References Cited

U.S. PATENT DOCUMENTS

2009/0304570 A1   12/2009  Kim et al.
2012/0301387 A1   11/2012  Neumann

FOREIGN PATENT DOCUMENTS

| CN | 101541674 | A |   | 9/2009 | | |
|---|---|---|---|---|---|---|
| CN | 103449400 | A |   | 12/2013 | | |
| CN | 106784847 | A |   | 5/2017 | | |
| CN | 106910893 | A |   | 6/2017 | | |
| EP | 2921468 |   | * | 9/2015 | ............. | C04B 35/52 |
| EP | 2921468 | A1 |   | 9/2015 | | |
| EP | 3476817 |   | * | 1/2019 | ........... | C04B 35/524 |
| EP | 3476817 | A1 |   | 5/2019 | | |
| JP | 2000223124 | A |   | 8/2000 | | |
| JP | 2012-527397 | A |   | 11/2012 | | |
| WO | 2002012380 | A2 |   | 2/2002 | | |
| WO | 2010135389 | A2 |   | 11/2010 | | |
| WO | 2014060508 | A1 |   | 4/2014 | | |

OTHER PUBLICATIONS

US Trademark Serial No. 98/195,578 (Year: 2024).*
Panbo Liu et al: "Ordered mesoporous carbon prepared from triblock copolymer/novolac composites", Journal of Porous Materials, Kluwer Academic Publishers, BO, vol. 20, No. 1, (2013) pp. 107-113 (published online Feb. 29, 2012) XPO35156156, ISSN: 1573-4854, DOI: 10.1007/S10934-012-9579-9.
Soonki Kang et al: "Synthesis of an ordered macroporous carbon with 62 nm spherical pores that exhibit unique gas adsorption properties", Chemical Communications, No. 16, Jul. 4, 2002, pp. 1670-1671, XPO55182448, ISSN: 1359-7345, DOI: 10.1039/b204756j.
International Search Report mailed May 28, 2020 by the European Patent Office for counterpart International Patent Application No. PCT/EP2020/057620.
Extended European Search Report mailed Aug. 7, 2019 by the European Patent Office for priority European Patent Application No. 19166722.9.
Search Report and Office Action issued Jul. 26, 2023 in CN Application No. 202080016178.9 (English translation of Office Action only).

(Continued)

*Primary Examiner* — Daniel C. McCracken
(74) *Attorney, Agent, or Firm* — Panitch Schwarze Belisario & Nadel LLP (57) ABSTRACT

Known processes for preparing a porous carbon material with a hierarchical porosity comprise the steps of a) providing at least one carbon source and at least one amphiphilic species, b) combining the carbon source and the amphiphilic species to obtain a precursor material, and c) heating the precursor material to obtain the porous carbon material having a modal pore size and a pore volume. In order to avoid a lengthy hydrothermal treatment and to allow tunability of the pore size, pore size distribution and pore volume in carbon material, it is proposed that the heating step c) comprises a low temperature treatment in which the precursor material is heated to a first temperature in the range between 300° C. and 600° C. to obtain a self-assembled porous carbonaceous material, and wherein heating to the first temperature comprises a first average heating rate in the range of 0.5° C./min to 5° C./min.

16 Claims, 5 Drawing Sheets

(56) References Cited

OTHER PUBLICATIONS

Costa et al., "Structure-charring relationship in phenol-formaldehyde type resins," Polymer Degradation and Stability, vol. 56, No. 1, pp. 23-35 (1997).
Jackson et al., "High Temperature Oxidative Degradation of Phenol-Formaldehyde Polycondensates," Journal of Applied Polymer Science, vol. 8, No. 5, pp. 2163-2193 (1964).

* cited by examiner

PROCESS FOR PREPARING A POROUS CARBON MATERIAL AND A POROUS CARBON MATERIAL OBTAINABLE BY THIS PROCESS

CROSS-REFERENCE TO RELATED APPLICATIONS

This application is a U.S. national phase application of International Patent Application No. PCT/EP2020/057620 filed on Mar. 19, 2020, that claims priority to European Patent Application No. 19166722.9 filed on Apr. 2, 2019, the entirety of which are incorporated herein by reference.

FIELD OF THE INVENTION

The present invention relates to a process for the preparation of a porous carbon material using an improved amphiphilic species.

Especially, the invention relates to a process for preparing a porous carbon material, especially a macroporous carbon material, comprising the steps:
a) providing at least one carbon source and at least one amphiphilic species,
b) combining the carbon source and the amphiphilic species so as to obtain a precursor material, and
c) heating the precursor material so as to obtain the porous carbon material having a modal pore size and a pore volume.

The invention further relates to a porous carbon material.

PRIOR ART

There exists a demand for porous carbon materials, especially for use in applications where both electrical conductivity and material permeability are required in the same substance. Such applications are for instance ion transfer cells, in which an electrode material interacts with charge carriers at a solid-liquid boundary.

The applications of porous carbon are generally based on the properties of the pore structure. Processes for producing a porous carbon material using a template acting as negative to shape the carbon are known in the prior art, for example from US 2012/0301387 A1. Therein, the pore structure of the carbon material is substantially predetermined by the structure of the template material. The template can for example be made from a silicon oxide and it is to be subsequently removed which corresponds to material loss and leading to a process which is expensive and health- and safety-wise complicated.

In another approach micro-, meso-, and macroporous carbon material is obtained via a polymerization type process. The process involves mixing a carbon precursor and a structure-directing agent, typically an amphiphilic molecule, in a solvent. Evaporation of the solvent induces a self-assembly that sets the porosity of the carbon precursor.

A modification of said polymerization type process that avoids a long time evaporation step is suggested in WO 2014/060508 A1. It describes forming a solution of polymerizable organic monomers as precursor of the macro- and mesoporous structured material and an amphiphilic poly (alkylene oxide) block copolymer; impregnating a polymeric foam with that solution, and subjecting the impregnated polymeric foam to a hydrothermal treatment. The thermal treatment induced the self-assembly of the precursor of the macro- and mesoporous structured material and the amphiphilic molecule in the polymeric foam. The carbon precursor is a phenolic resin obtained by reaction of a formaldehyde and phenol. The block copolymer is poly (ethylene oxide) with poly(propylene oxide) moieties. The hydrothermal treatment is performed in an autoclave for generally one to 4 days at an autogeneous pressure and at a temperature ranging from 40 to 200° C. The coated polymeric foam is removed from the autoclave and it is subjected to a carbonization process at temperature of from about 500° C. to about 1000° C., in an inert atmosphere to thermally cross-link the phenolic resin. The heating ramp in the carbonization process is controlled to avoid the shrinkage of the polymeric foam and the rate can be form 0.5° C. to 10° C. per minute. The carbonized carbon foam is subjected to catalytic graphitization.

The obtained hierarchical carbon material has a bimodal pore size distribution due to the porosity from the polymeric foam and the self-assembly, with the primary fraction being macropores and the minor fraction being mesopores. The macropores aid in the increased transport properties in electrochemical applications and other applications.

EP 2 921 468 A1 describes a process for the production of a flexible graphitized carbon foam comprising a structure of interconnected macropores with mesoporous walls. The process comprises providing a carbon source and an amphiphilic species, combining carbon source and amphiphilic species to obtain a precursor material, and heating the precursor material to obtain the macroporous carbon material. Carbonization is achieved by heating to a temperature in the range 500° C. to 1000° C. at a heating rate in the range 0.5° C./min to 10° C./min.

Panbo Liu et al. in "Ordered mesoporous carbon prepared from triblock copolymer/novolac composites" (J. Porous Materials (2013) 20:107-113) describe a process for the production of mesoporous carbon by self-organization using "Novolak" as carbon precursor and two types of triblock copolymers (Pluronic F127 and P123) as amphiphilic species. Pluronic F127 is dissolved in ethanol in a ratio of 1:30, the solvent being then evaporated at room temperature. The calcination is carried out in a tube furnace under a nitrogen atmosphere by heating at 500° C. and 700° C. for 3 hours. The heating rate is 1° C./min at temperatures below 600° C. and 5° C./min above 600° C.

WO 2002/12380 A2 describes porous carbon material and a process for its production by self-assembly using a carbon precursor and an amphiphilic species. The dependencies of the pore size distribution of the porous carbon material are investigated. The mean pore size is in the range of 2 to 50 nm (or more).

Soonki Kang et al. in "Synthesis of an ordered macroporous carbon with 62 nm spherical pores that exhibit unique gas adsorption properties" (Chem Communications (Camb). 21 Aug. 2002; (16):1670-1671) describe an ordered macroporous carbon with a narrow particle size distribution around 62 nm. It is produced here by a colloidal crystal template process.

Technical Objective

The known process requires a lengthy hydrothermal treatment, and it uses the polymeric foam as a template material.

There persists a need to provide improved methods for making porous carbon materials, in particular by a polymerization type process without employing a solid template and with a short polymerization step. There also exists a need for porous carbon materials with properties best adapted to a specific application.

It is an object of the invention to provide a process that avoids the disadvantages of the known method and which allows tunability of the pore size, pore size distribution and pore volume in carbon material with a hierarchical porosity.

SUMMARY OF THE INVENTION

A contribution to achieving at least one of the above objects is made by the independent claim. The dependent claims provide preferred embodiments of the present invention which also serve to solve at least one of the above-mentioned objects.

In the process of the invention heating step c) comprises a low temperature treatment in which the precursor material is heated to a first temperature in the range between 300° C. and 600° C., preferably between 300° C. and 500° C., and even more preferred between 450 and 500° C., wherein heating to the first temperature comprises a first average heating rate in the range of 0.5° C./min to 5° C./min.

During the low temperature treatment, the amphiphile species will decompose and leaves the system and cross-linking of the carbon source (e.g. a phenolic resin) will occur. The amphiphilic species serves to direct the formation of a three-dimensional structure from the carbon source during heating step c) and then thermally decomposes. The amphiphilic species is considered a soft (or sacrificial) template; a hard template material is not required for that process. This makes the process cheaper and easier to scale.

The precursor material is subjected to a self-assembly process which preferably is induced and finalized during the low temperature treatment. The result of crosslinking and pyrolysis of the carbon source/amphiphile species mixture is a self-assembled porous carbonaceous material. The final heating temperature during the low temperature treatment in the temperature range from 300° C. to 600° C., here referred to as the "first temperature", is determined for a specific recipe as the temperature at which the decomposition of the amphiphile is sufficiently complete. In most cases the first temperature is between 300° C. and 500° C. and even more preferred between 450 and 500° C. As soon as said first temperature is reached, the self-assembled porous carbonaceous material is obtained, and the low-temperature treatment is terminated, so that the average heating rate is no longer decisive for the pore size and pore size distribution. Therefore, the average heating rate may or may not change during any further heating of self-assembled porous carbonaceous material.

The low temperature treatment results in a solid, self-assembled porous carbonaceous material. The decomposition of the specific amphiphile material may be determined by a thermal gravimetric analysis of a sample of that material. The parameters of the thermal gravimetric analysis are as follows:

Initial mass of the sample: about 10-20 mg
Constant heating rate: 5° C./min starting from 25° C.
Argon flow: 20 ml/min.

Here, a sufficiently complete decomposition is defined if the remaining mass $\Delta m$ (in %) of the sample is at most 40% of the initial weight. The remaining mass is determined by [{(sample mass at temperature T−apparent mass from buoyancy at temperature T)/initial sample mass}×100] displayed in percent [%].

When during the low temperature heating process the temperature is reached at which "sufficiently complete" decomposition is achieved, the "first temperature" is reached and heating process can be terminated, but as a rule and preferably it is continued until the temperature is reached, at which complete decomposition is achieved.

The average heating rate is determined as the quotient of the temperature interval between a start temperature and the first temperature, where the start temperature is the temperature of the precursor material after combination of components according to step b) and before the heating process starts. A suitable start temperature is 25° C.

Generally, the modal pore size, the pore size distribution and the pore volume of the final carbon material depend on the individual constituents and composition of the specific precursor material (in the following also referred to as the "specific recipe") formed in the combination step b). Surprisingly, it has been shown that the heating rate during the low temperature treatment also has a significant influence on the pore size, the pore size distribution and the pore volume. Generally, the pore volume as well as both the pore size and the pore size distribution increase as the heating rate is increased. Thus, the final modal pore size and the final mean pore volume and the final pore size distribution can be varied within a certain range permitted by the specific precursor. Therefore, according to an aspect of the invention, the average heating rate in the low temperature treatment step is set to a value in the range of 0.5° C./min to 5° C./min for adjusting and tailoring of the modal pore size, the pore size distribution and pore volume of the final carbon material.

The porous carbon material can be employed in a number of technical applications. Preferred applications are the following: An electrochemical cell; a fuel cell, in particular a hydrogen fuel cell, and there in particular in proton exchange membrane; a capacitor; an electrode; and a catalyst. Preferred electrochemical cells in this context are lead acid cells and lithium ion cells. Preferred fuel cells in this context are hydrogen cells. Preferred capacitors in this context are electric double layer capacitors. The individual applications may require different properties of the porous carbon materials and especially different pore volumes and pore sizes. Tunability of the pore size and pore volume according to the present invention allows for tailored carbon additives for specific applications. For example, for a specific application an optimum can be determined for both the pore volume and for the modal pore size, so that for the porous carbon material to be used in the specific application values to be established with respect to average pore volume and pore size can be specified and pre-determined.

A pre-determined modal pore size, a pore size distribution and a pre-determined pore volume can be achieved if a suitable formulation of the precursor material is known by chance. On the other hand, the invention allows the use of a recipe that only partially meets the requirements, because this can be treated during the low-temperature treatment in such a way that the pre-determined values are met. Therefore, according to a preferred embodiment of the process the first average heating rate is set in dependence of a pre-determined modal pore size, a pore size distribution and a pore volume of the porous carbon material.

If, for a specific recipe, the heating rate dependency of the pore size and pore volume are not known, the setting of the average heating rate may comprise a step of establishing a calibration curve to the dependency of the pore size and/or the pore volume on the average heating rate.

To establish the calibration curve, it may be sufficient to determine the modal pore size, the pore size distribution and/or pore volume for two or more different heating rates, e.g. the heating rates which limit the range from 0.5° C./min to 5° C./min, so that modal pore sizes, pore size distributions and/or pore volumes for intermediate heating rates can be extrapolated or calculated.

The most preferred modal pore size of the porous carbon material is in the range between 50 and 280 nm. The preferred total pore volume in the range from 0.4 to 1.75 $cm^3/g$ for pores having a diameter in the range from 10 nm to 10,000 nm; and the most preferred pore size distribution is as narrow as possible. A narrow pore size distribution is assumed if for a sample number of at least three, a standard deviation in the modal pore size is less than 50 nm, preferably less than 30 nm, most preferred less than 25 nm.

In addition to the carbon source and the amphiphilic species the precursor material obtained in step b) may comprise a crosslinking agent, a solvent and/or a dispersant. The amphiphilic species may be the dispersant, or the dispersant may be one of several amphiphilic species. Usually said combining step requires a mixing of the constituents forming the precursor material. The mixing step is preferably carried out prior to the heating step.

In one embodiment, heating according to step c) is started within 1 hour of the combining step b), preferably within 20 minutes, more preferably within 10 minutes, more preferably within 1 minute.

In a preferred embodiment the low temperature treatment comprises a temperature dwell time of 15 to 60 minutes at a holding temperature lower than the above defined "first temperature", the holding temperature is preferably less than 450° C. and most preferred less than 350° C.

A dwell time may be set at temperatures where the precursor material undergoes transformations like an evaporation or decomposition of a constituent, especially at high heating rates. It was found that the dwell time does not much influence the pore size and pore volume if the holding temperature is less than 200° C. and the dwell time is less than 15 min.

During crosslinking and pyrolysis of the carbon source (e.g. a phenolic resin) and the amphiphile species occurs. The carbon source decomposes during the heat treatment and forms carbon with a yield in the range typically from 30-50 wt. %. The amphiphile species decomposes almost completely and serves as a pore former, which reduces the total carbon yield of the mixture (e.g. to 15-33 wt. %). The crosslinking and pyrolysis steps are typically carried out in inert atmosphere at atmospheric pressure or slightly below atmospheric pressure. This is because it is to be assumed that an oxidizing atmosphere at high temperatures can lead to carbon burn-off. The crosslinking and pyrolysis steps may also be carried out under low pressure or under vacuum, e.g. an absolute pressure lower than 500 mbar, preferably lower than 300 mbar.

Surprisingly, it was found that the yield (expressed in %) of the carbon in the precursor material can be increased up to about 10% (absolute value) if the heating step c) comprises an oxidation phase in which the precursor material is treated in an atmosphere containing an oxidizing agent. The oxidizing agent may contain oxygen preferably the oxidizing agent comprises at least one of the components of the group consisting of oxygen, carbon dioxide and water. A possible (but not binding) explanation for the higher yield is that oxygen form the oxidizing agent is incorporated into the polymer network. However, the incorporation is not such that the oxygen is removed during further carbonization by leaving the product as CO or $CO_2$, which would reduce the overall carbon yield, but rather that the incorporated oxygen stabilizes the polymer network during crosslinking and this stabilization reduces further carbon loss.

Therefore, in a preferred embodiment the heating of the precursor material in step c) comprises an oxidation phase in which the precursor material is heated in an atmosphere containing an oxidizing agent.

It has been found advantageous if the atmosphere containing an oxidizing agent during heating the precursor material during the oxidation phase may be an containing atmosphere oxygen in molecular form, as $O_2$, preferably an atmosphere with an oxygen content of less than 25% by volume, particularly preferably air.

The "oxidizing effect" of the atmosphere causes an oxidation of the precursor material, especially the oxidation of the carbon source. The intensity (rate) of the oxidation reaction depends on the temperature. At the lower temperature limit mentioned above, the intensity is sufficiently high to avoid long heating times. At the upper temperature limit the atmosphere containing an oxidizing agent is changed and further heating takes place under inert gas. The upper temperature limit can (but does not have to) simultaneously correspond to the "first temperature" for the low temperature treatment.

The heating of the precursor material during the oxidation phase is carried out preferably in a temperature range between 150° C. and 520° C., more preferably between 200° C. and 470° C.

The degree of oxidation also depends on the content of the oxidizing agent, e.g. oxygen in molecular form, in the oxidizing atmosphere and on the duration of the oxidizing phase.

It has proven to be beneficial if the oxidation phase has a duration in the range of 60 to 360 minutes, preferably in the range of 120 to 300 minutes.

In a preferred embodiment the heating step c) comprises a high temperature treatment, during which the solid porous precursor material is subjected to a second temperature of at least 700° C. and not more than 3000° C.

During the high temperature treatment carbonization is completed if still necessary and graphitization of the carbonized material may occur. Graphitization occurs in the temperature range from 1200 to 3000° C., more preferably in the range from 1500 to 2800° C., most preferably in the range from 1700 to 2500° C.

The low temperature treatment and the high temperature treatment may be performed in a single heating step, without any cooling and without any lengthy dwell time, like the 1 to 4 days of hydrothermal treatment as it is known from the prior art. On the other hand, after carbonization once has started, the initial heating rate dependence of the pore size is lost, so that the heating step can be interrupted and split into two or more temperature ramps, one for the initial ramp, then cooled and possibly mechanical treated, then a last heating ramp up to any final treatment temperature. This provides additional flexibility when considering possible production processes.

The tunability of pore size and pore volume according to the invention is especially appropriate if the precursor material is very sensitive to the heating rate, i.e. where pore size and pore volume show a strong dependence on the heating rate.

In particular with regard to this high sensitivity on the heating rate, the precursor material preferably is such that when subjected to a low temperature treatment at an average heating rate of 5° C./min it has more than twice the modal pore size than at an average heating rate of 2° C./min.

The amphiphilic species is preferably present in the precursor material in the form of micelles and 3-dimensional structures and it possesses both hydrophilic and lipophilic behavior. Preferred amphiphilic species comprise a first amphiphilic compound, the first amphiphilic compound comprising two or more adjacent ethylene oxide based repeating units, preferably 5 or more, more preferably 7 or more, more preferably 20 or more, or 30 or more, or 50 or more, and up to 1000 adjacent ethylene oxide based repeating units.

Preferably the first amphiphilic compound comprises more than 10 wt. % of ethylene oxide based repeating units, based on the total weight of the first amphiphilic compound, preferably more than 20 wt. %, more preferably more than 30 wt. %, most preferably more than 40 wt. %, and especially up to 90 wt. % of ethylene oxide based repeating units. It may comprise a further repeating unit, which preferably is based on one selected from the group consisting of: propylene oxide, butylene oxide, ethylene, propylene and butylene, preferably propylene oxide. The ethylene oxide based repeating unit has the formula —$(CH_2CH_2O)$—. The propylene oxide based repeating unit has the formula —$(CHCH_3CH_2O)$—.

The carbon source may be a carbon compound comprising a ring, especially an aromatic ring with one or more hydroxyl groups connected thereto.

In a preferred embodiment the carbon source is selected from the group consisting of Novolac type phenolic formaldehyde resins, especially Novolac type resorcinol-formaldehyde resins or in the alternative Novolac type phenol-formaldehyde resins, hydrolysable tannic acid, lignin, cellulose resins. The carbon source is a single material or it contains a mixture of two or more carbon source materials.

The ratio of the amount by weight of carbon source to the amount by weight of the amphiphilic species is for example in the range from 10:1 to 1:10, preferably in the range from 8:1 to 1:5, also preferably in the range from 5:1 to 1:3, more preferably in the range from 5:2 to 1:2.

A precursor material that meets this requirement may comprises a block copolymer of propylene oxide and ethylene oxide, containing 15 wt. % to 25 wt. % ethylene oxide, especially 20 wt. % ethylene oxide, or, in the alternative, a surfactant containing 50 to 80 wt. % of ethylene oxide, and/or the precursor material comprises an aqueous resorcinol-formaldehyde Novolac resin, a solid resorcinol-formaldehyde Novolac resin, or a solid phenolic-formaldehyde Novolac resin.

A solvent free precursor material is preferred. Organic solvents are often flammable or toxic, and aqueous solvents can only be removed with great effort.

The porous carbon material of the present invention is obtainable by the process described above. It is characterized in that it contains pores defined by a modal pore size in the range between 50 and 280 nm and, for a sample number of at least three, a standard deviation in the modal pore size of less than 50 nm, preferably less than 30 nm, most preferred less than 25 nm.

Test Methods and Definitions

The following test methods are used in the invention. In absence of a test method, the ISO test method for the feature to be measured published most recently before the earliest filing date of the present application applies. In absence of distinct measuring conditions, standard ambient temperature and pressure (SATP) as a temperature of 298.15 K (25° C., 77° F.) and an absolute pressure of 100 kPa (14.504 psi, 0.986 atm) apply.

Mercury Porosimetry (Pore Size and Pore Volume)

The specific pore volume for different pore sizes, the cumulative pore volume, and the porosity were measured by mercury porosimetry. The mercury porosimetry analysis was performed according to ISO15901-1 (2005). In this test, mercury is pressed into the pores of the porous material under the action of an external pressure against the opposing surface tension forces. The force needed is inversely proportional to the pore size and therefore, as well as the cumulative total pore volume, the pore size distribution of the specimen can also be determined.

A Thermo Fisher Scientific PASCAL 140 (low pressure up to 4 bar) and a PASCAL 440 (high pressure up to 4000 bar) and SOLID Version 1.6.3 (26 Nov. 2015) software (all from Thermo Fisher Scientific, Inc.) were calibrated with porous glass spheres with a modal pore diameter of 140.2 nm and pore volume of 924.4 $mm^3/g$ (ERMFD122 Reference material from BAM). During measurements the pressure was increased or decrease continuously and controlled automatically by the instrument running in the PASCAL mode and speed set to 8 for intrusion and 9 for extrusion. The Washburn method was employed for the evaluation and the density of Hg was corrected for the actual temperature. Value for surface tension was 0.48 N/m and contact angle 140°. Sample size was between about 25 and 80 mg. Before starting a measurement, samples were heated to 150° C. in vacuum for 1 hour.

The mercury porosimetry is suitable for the measurement of relatively large pores (mesopores to macropores). Mesopores means pores with pore sizes in the range between 2 and 50 nm, macropores means pores with pore sizes higher than 50 nm and micropores means pores with pore sizes of less than 2 nm.

A "modal pore size" refers to the pore size in the mercury intrusion curve. Here, it means the pore diameter that exhibits the largest value of a log differential pore volume on a diagram in which the log differential pore volume (dV/d (log D), wherein V represents a mercury penetration volume, and D represents a pore diameter) is plotted against the pore diameter measured with a mercury porosimeter, and is based on a volume. The dV/d (log D) curve is the probability density function of the pore size. The "modal pore size" corresponds to the pore size with the greatest abundance. Specifically, the most frequent pore size can be measured by a method described above.

Gas Adsorption (Total Specific Surface Area ($BET_{total}$) and External Surface Area ($BET_{ext}$))

BET measurements to determine the specific surface area of particles are made in accordance with DIN ISO 9277: 2010. A NOVA 3000 (from Quantachrome) which works according to the SMART method (Sorption Method with Adaptive dosing Rate), is used for the measurement. As reference material Quantachrome Alumina SARM Catalog No. 2001 (13.92 m2/g on multi-point BET method), and SARM Catalog No. 2004 (214.15 $m^2/g$ on multi-point BET method) available from Quantachrome are used. Filler rods are added to the reference and sample cuvettes in order to reduce the dead volume. The cuvettes are mounted on the BET apparatus. The saturation vapour pressure of nitrogen gas ($N_2$ 4.0) is determined. A sample is weighed into a glass cuvette in such an amount that the cuvette with the filler rods is completely filled and a minimum of dead volume is created. The sample is kept at 200° C. for 1 hour under vacuum in order to dry it. After cooling the weight of the sample is recorded. The glass cuvette containing the sample is mounted on the measuring apparatus. To degas the sample, it is evacuated at a pumping speed selected so that no material is sucked into the pump to a final pressure of 10 mbar.

The mass of the sample after degassing is used for the calculation. For data analysis the NovaWin 11.04 Software is used. A multi-point analysis with 5 measuring points is performed and the resulting total specific surface area ($BET_{total}$) given in $m^2/g$. The dead volume of each sample cell is determined once prior the measurement using Helium gas (He 4.6, humidity 30 ppmv). The glass cuvettes are cooled to 77 K using a liquid nitrogen bath. For the adsorptive, $N_2$ 4.0 with a molecular cross-sectional area of 0.162 $nm^2$ at 77 K is used for the calculation.

The empirical t-plot methodology is used according to ISO15901-3:2007 to discriminate between contributions from micropores and remaining porosity at relative pressures of more than 0.1 (i.e. mesoporosity, macroporosity and external surface area contributions) and to calculate the micropore surface ($BET_{micro}$) and micropore volume. The low pressure isotherm data points up to a cut-off $p/p_0$, typically up to 0.1 $p/p_0$ are selected to determine the linear section of the t-plot. Data point selection is validated by obtaining a positive C constant. The micropore volume is determined from the ordinate intercept. The micropore specific surface area (BETmicro) can be calculated from the slope of the t-plot.

The external specific surface area $BET_{ext}$ is defined by subtracting the micropore specific surface area from the total specific surface area, $BET_{ext}=BET_{total}-BET_{micro}$.

Thermal Gravimetric Analysis (TGA)

The thermal gravimetric analysis was performed on the Netzsch TG 209F1 Libra thermal analyzer with Netzsch *Proteus* software. The TG209 standard sample holder and the standard type K thermocouple for sample temperature measurement were used. The typical initial sample mass was around 15-30 mg. No preconditioning steps were performed prior to the measurement.

The mass of the sample, in an $Al_2O_3$ crucible, is recorded as the temperature in the measuring chamber is increased from 25° C. to 1000° C. at a heating rate of 5° C./min in an argon atmosphere (purity 5.0) at a flow of 20 $cm^3/min$.

In order to correct for the change in buoyancy during the experiment, the apparent mass of an $Al_2O_3$ crucible filled with a similar volume of inert $Al_2O_3$ powder is recorded separately under comparable conditions, and is subtracted from the measured signal.

The collected data is plot as the measured remaining mass percent, determined by [{(sample mass at temperature T−apparent mass from buoyancy at temperature T)/initial sample mass}×100] displayed in percent [%] (on the primary y-axis) and the sample temperature T from the thermocouple (on the secondary y-axis) as a function of time or alternatively the plots can have the temperature directly as the x-axis.

SHORT DESCRIPTION OF THE FIGURES

The invention is now further elucidated with reference to the figures. The figures and figure descriptions are exemplary and are not to be considered as limiting the scope of the invention.

EXAMPLES

In the preferred embodiment the porous carbon material is produced by combining an aqueous resorcinol-formaldehyde resin (Novolac resin) or solid pellets of resorcinol-formaldehyde/phenolic-formaldehyde resin (Novolac types) and an amphiphilic molecule (either a block copolymer or a surfactant or a (non-ionic) emulsifier or a combination of amphiphilic molecules). The components are mixed to obtain a homogenous precursor material.

The heat treatment of this is performed in one-step in inert atmosphere (nitrogen or argon). The heating rate from room temperature to 400° C. ranges from 0.67° C./min to 5° C./min. Thereafter the heating begins again to the desired final temperature from 600 to 3000° C., preferably above 900° C. The thus obtained porous carbon material is cooled down, removed from the oven, and mechanical crushed/milled to the desired particle size.

The recipe of the constituents of the specific precursor material sets the initial parameters for the resulting porous carbon material. Additional tuning of the modal pore size and of the pore volume can be achieved by the heating ramp during the critical self-assembly step.

To understand the heating rate dependence for the carbon materials, a series of heating ramps (nine in total) were performed on four different precursor materials (recipes). The experimental data are summarized in Table 1.

TABLE 1

| Ramp number | $r_{H1}$ [° C./min] | T1 [° C.] | t1 [min] | $r_{H2}$ [° C./min] | T2 [° C.] | t2 [min] |
|---|---|---|---|---|---|---|
| R1 | 1 | 250 | 30 | 1.4 | 500 | 30 |
| R2 | 1 | 120 | 30 | 1 | 900 | 180 |
| R3 | 1 | 325 | 30 | 1 | 900 | 180 |
| R4 | 1 | 200 | 30 | 1 | 900 | 180 |
| R5 | 1 | 900 | 180 | — | — | — |
| R6 | 5 | 400 | 60 | 1 | 900 | 180 |
| R7 | 1 | 400 | 30 | 2 | 900 | 180 |
| R8 | 2 | 250 | 30 | 1 | 400 | 30 |
| R9 | 0.67 | 250 | 30 | 1 | 400 | 30 |

$r_{H1}$ is an average heating rate starting from room temperature,
T1 is a first holding temperature
t1 is a first dwell time at first holding temperature
$r_{H2}$ is a heating rate from first holding temperature
T2 is a second holding temperature
t2 is a second dwell time at second holding temperature In the low temperature region (here until 400° C.) the heating ramp 9 provides an average heating rate of 0.67° C./min, the heating ramp 8 provides an average heating rate of 2° C./min, the heating ramp R6 provides an average heating rate of 5° C./min and the remaining heating ramps have an average heating rate of 1° C./min.

Various dwell times were tested to see whether potential processes were critical for the final product, especially in temperature ranges in which a transformation of the precursor material may be expected.

It was found that dwell times did not have as much influence on pore sizes and pore volumes as the initial heating ramp up to 400° C. In addition, it was proved that the heating rate dependence of the modal pore size and pore volume occurs only during the low temperature heat treatment up to about 500° C. and prior than start of the carbonization of the precursor material.

Table 2 lists the tested recipes No. 1 to No. 4:

TABLE 2

| Recipe No | Carbon source | Amphiphilic species | Weight ratio Carbon source/ Amphiphilic species |
|---|---|---|---|
| 1 | Askofen ® 779 W 50 | Genapol ® PF20 | 10:3 |
| 2 | Askofen ® 779 W 50 | Pluronic ® P123 | 5:3 |
| 3 | Askofen ® 779 W 50 | Genapol ® PF20 | 5:3 |
| 4 | Askofen ® 779 W 50 | Genapol ® X-100 | 10:3 |

The 'weight ratio' indicated in the fourth column refers to the ratio of the total masses of the respective substances. The 779 W 50 Askofen resin, for example, is an aqueous resorcinol-formaldehyde resin of the Novolac type, and contains 50 wt. % solid resin and 50 wt. % liquid phase. Therefore, 5 parts by weight of this substance correspond to 2.5 parts by weight of the resin For each recipe, four crucibles were filled in each run to see the temperature homogeneity of the oven and the reproducibility of the recipes.

Figure 1:
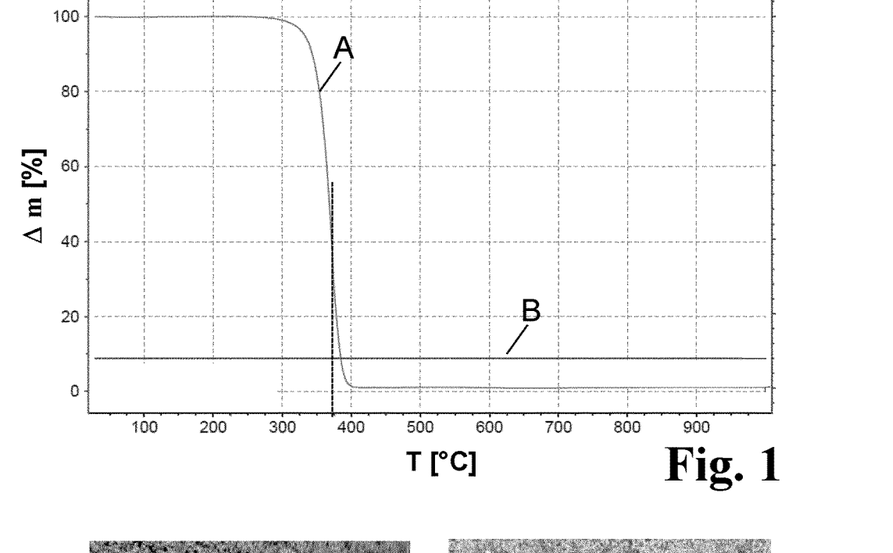
FIG. 1 shows a diagram of a thermal gravimetric analysis of a specific amphiphile material.
Figure 2:
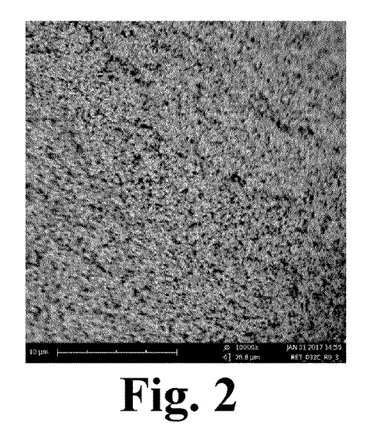
FIG. 2 shows an SEM image of the surface of a material prepared according to the invention prepared by using a first recipe and a heating rate of 0.67° C./min.
Figure 3:
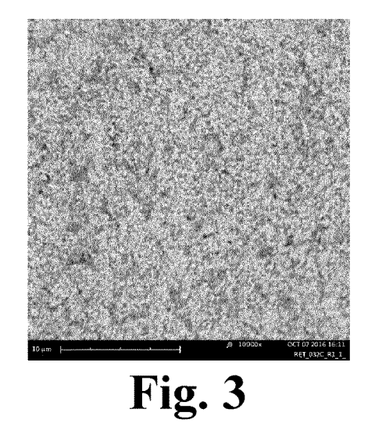
FIG. 3 shows an SEM image of the surface of a material prepared according to the invention prepared by using a first recipe and a heating rate of 1° C./min.
Figure 4:
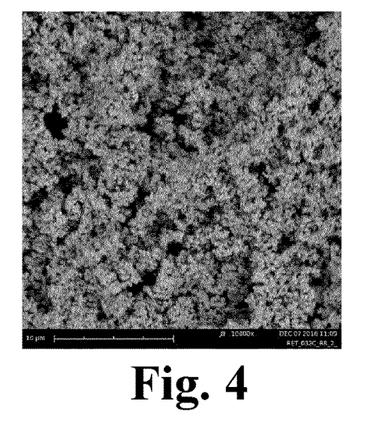
FIG. 4 shows an SEM image of the surface of a material prepared according to the invention prepared by using a first recipe and a heating rate of 2° C./min.

The diagram of FIG. 1 show results of a thermal gravimetric analysis in argon up to 1000° C. of an amphiphile material. The remaining mass compared to the original sample mass Δm (in %) of the sample is plotted on the ordinate as a function of the heating temperature T (in ° C.). The heating temperature is a linear function of the heating rate which remains constant at 5° C./min until the end temperature of 1000° C. is reached.

Curve A in FIG. 1 shows the evolution of the mass of the sample as a function of temperature, and curve B the mass flow of argon flushing (which is constant at 20 ml/min). The weight loss can be explained by continuing thermal decomposition of the amphiphilic species. Accordingly, until a temperature of about 200° C. the mass loss of the amphiphile material is small. At a temperature above 500° C. the mass loss is almost completed, showing the nearly full decomposition of the amphiphilic soft template material. The amphiphile material loses about 98.85% of its initial weight upon treatment up to 1000° C.

At a temperature of about 380° C. the amphiphilic species has lost 60% of its initial weight. In this specific case, the temperature of 380° C. represents a "first temperature" of the low temperature treatment process. Most of the amphiphilic species is decomposed so that the porosity of the remaining materials is set during the low temperature treatment until the "first temperature" is reached. At higher temperature, the porosity will not change dramatically so that further temperature treatments do not need have such a slow heating ramp.

Figure 5:
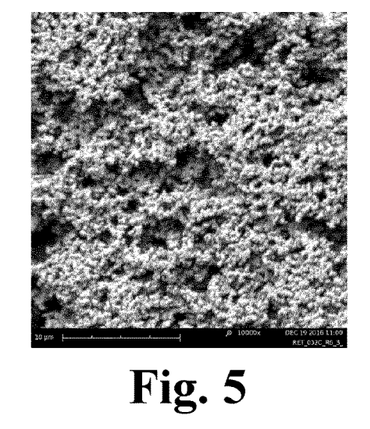
FIG. 5 shows an SEM image of the surface of a material prepared according to the invention prepared by using a first recipe and a heating rate of 5° C./min.
Figure 6:
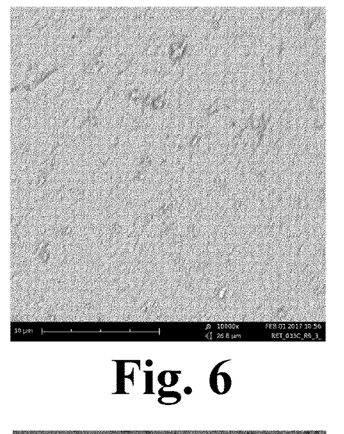
FIG. 6 shows an SEM image of the surface of a material prepared according to the invention prepared by using a second recipe and a heating rate of 0.67° C./min.
Figure 7:
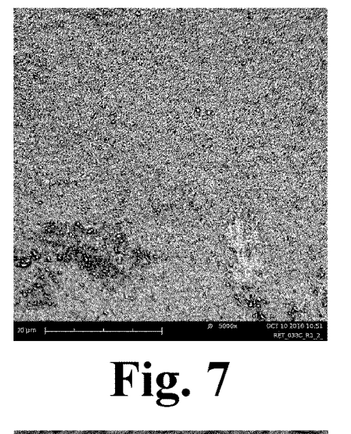
FIG. 7 shows an SEM image of the surface of a material prepared according to the invention prepared by using a second recipe and a heating rate of 1° C./min.
Figure 8:
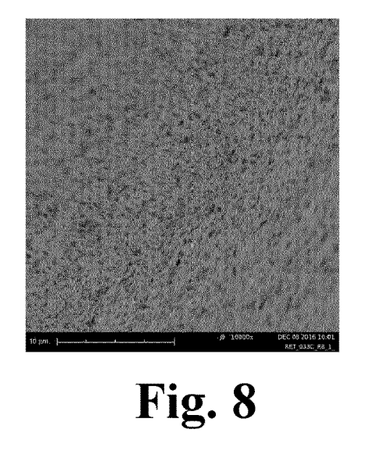
FIG. 8 shows an SEM image of the surface of a material prepared according to the invention prepared by using a second recipe and a heating rate of 2° C./min.
Figure 9:
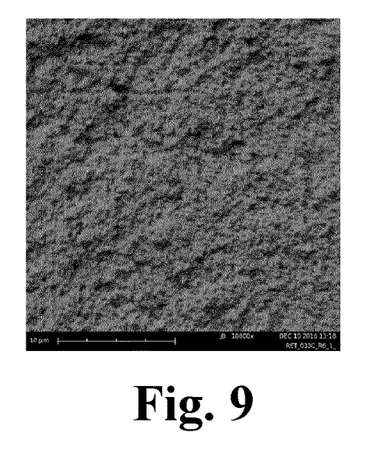
FIG. 9 shows an SEM image of the surface of a material prepared according to the invention prepared by using a second recipe and a heating rate of 5° C./min.

The scanning electron images in FIGS. 2 to 5 show impressively that the porous nature of the carbon material produced from the precursor material of recipe No. 1 changes with the heating rate during the low temperature treatment. At a heating rate of 0.67° C./min (FIG. 2), the porosity is significantly lower than at a heating rate of 5° C./min (FIG. 5). The scale bar has a length of 10 μm in each of the SEM photos.

The scanning electron images in FIGS. 6 to 9 show the same dependency for recipe No. 2. Since the recipe itself generates smaller pores, the effect of the pore size dependency is less visible as for recipe No. 1. Again the scale bar has a length of 10 μm in each of the photos.

Figure 10:
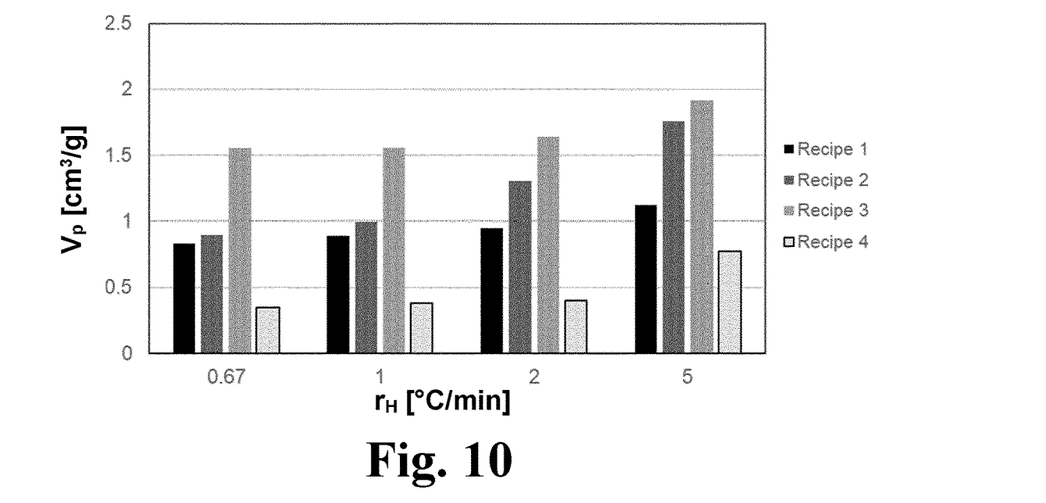
FIG. 10 shows a diagram of the dependence of the pore volume on the heating rate for four different recipes.

In the diagram of FIG. 10, the mean pore volume $V_p$ (in cm³/g) of each of the four recipes is plotted versus the initial heating rate $r_H$ (in ° C./min) during the low temperature treatment in the temperature interval between 25° C. and 400° C. The pore volume increases slightly as the rate of the heating is increased.

Figure 11:
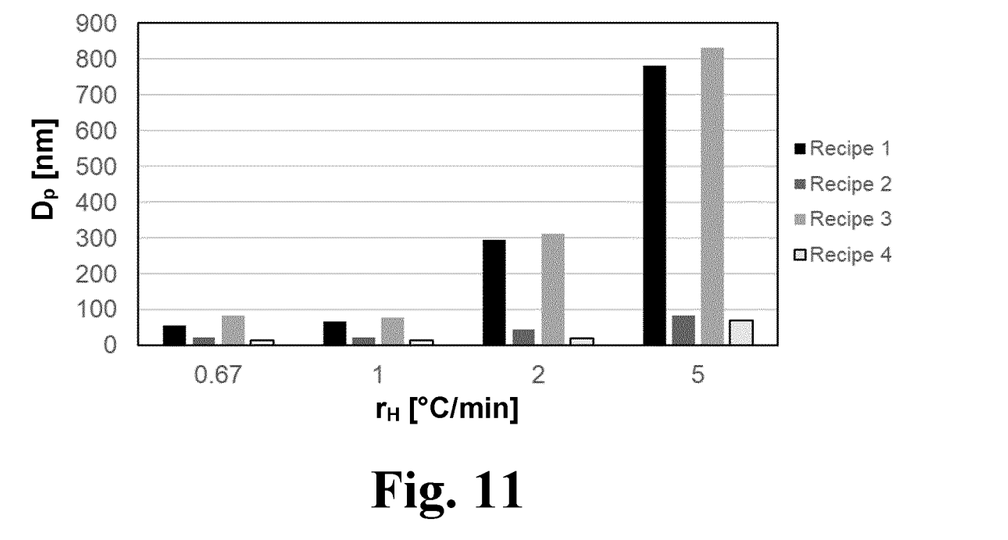
FIG. 11 shows a diagram of the dependence of the modal pore size on the heating rate for four different recipes.

In the diagram of FIG. 11, the modal pore size $D_p$ (in nm) of each of the four recipes is plotted versus the initial heating rate $r_H$ (in ° C./min) during the low temperature treatment in the temperature interval between 25° C. and 400° C. The modal pore size shows a dramatic increase when the heating rate is increased above 1° C./min. The recipes 1 and 3 show the clearest dependence between pore size and heating rate. A heating rate of 5° C./min causes more than twice the pore size than the heating rate of 2° C./min, and the heating rate of 2° C./min causes more than twice the pore size than the heating rate of 1° C./min.

The values plotted in FIGS. 10 and 11 are the mean values of four reproductions for each recipe.

Figure 12:
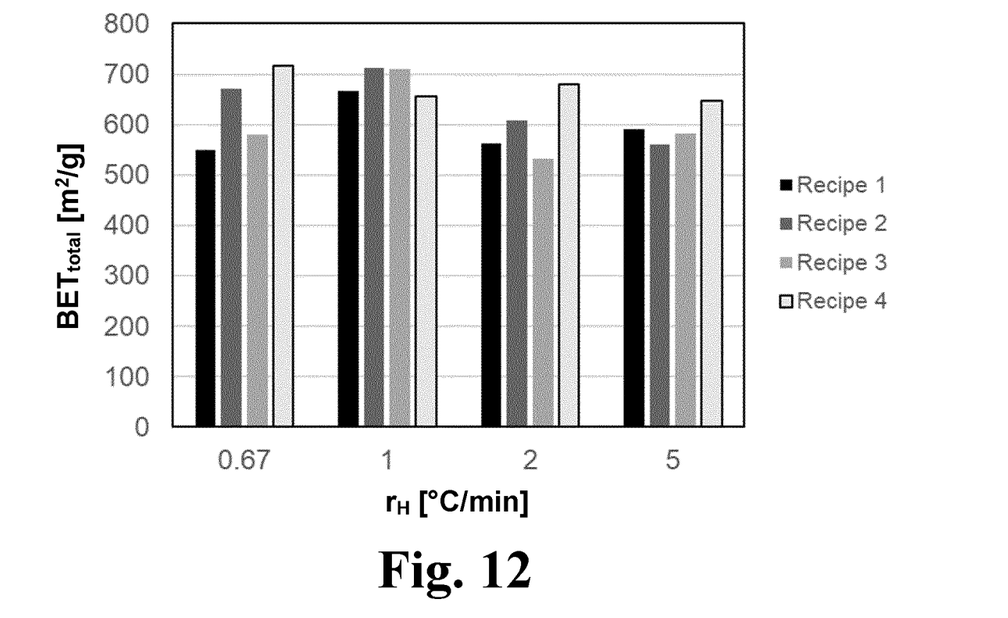
FIG. 12 shows a diagram of the dependence of the total BET surface on the heating rate for four different recipes.
Figure 13:
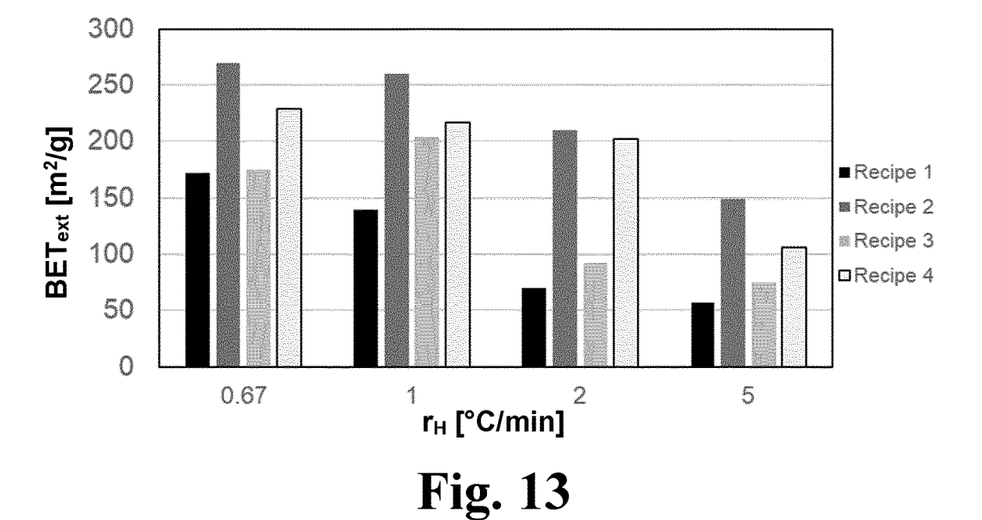
FIG. 13 shows a diagram of the dependence of the extern BET surface on the heating rate for four different recipes.

The diagrams of FIGS. 12 and 13 show the dependence of the BET surface area, both total ($BET_{total}$ in m²/g) and external ($BET_{ext}$ in m²/g), on the initial heating rate $r_H$ (in ° C./min) for all four recipes tested. The values plotted are the mean of the four reproductions for each recipe. The total $BET_{total}$ does not show a consistent change as the heating rate is changed, however the external $BET_{ext}$, for most recipes, shows a decrease when the heating rate is increased above 1° C./min.

The external specific surface area $BET_{ext}$ is defined by subtracting the micropore specific surface area from the total specific surface area, $BET_{ext} = BET_{total} - BET_{micro}$.

Figure 14:
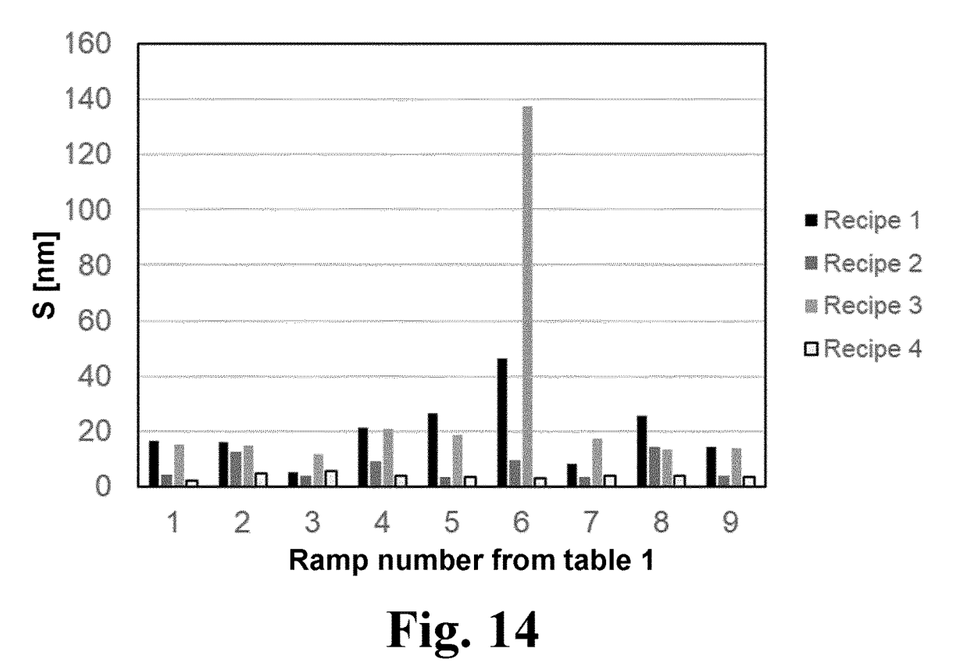
FIG. 14 shows a plot about the standard deviation in the modal pore size in dependence of heating rates for four different recipes.

FIG. 14 shows the sample standard deviations of the modal pore size (in nm) obtained for the four crucibles of each recipe as a function of the ramp number (see Table 1).

The formula for the sample standard deviation is $$s = \sqrt{\frac{\sum_{i=1}^{N}(x_i - \bar{x})^2}{N-1}}.$$

where $\{x_1, x_2, \ldots, x_N\}$ are the measured values of the modal pore diameters of each sample. $\bar{x}$ is the mean value of the modal pore sizes (the sum of the sampled values divided by the number N of measurements, wherein N=4.

The standard deviation increases as the initial heating rate increases (ramp of recipe 6 with 5° C./min and ramp of recipe 8 with 2° C./min). Ramp of recipe 5 has no holds and goes from room temperature direct to 900° C. with 1° C./min. The ramp with lowest standard deviation is the ramp of recipe 3 which has a hold at 325° C. for 30 minutes. The low values of standard deviation resulting from the claimed low temperature treatment process represent a narrow pore size distribution.

The precursor material mixture typically contains a novolac resin and an amphiphilic surfactant. An example for the novolac resin is Alnovol® PN320 (Allnex) and for the surfactant Genapol® PF20 (Clariant) or Synperonic® PE/L64 (Croda). The ratio of the resin to surfactant is in general 5:(1.5-9).

Figure 15:
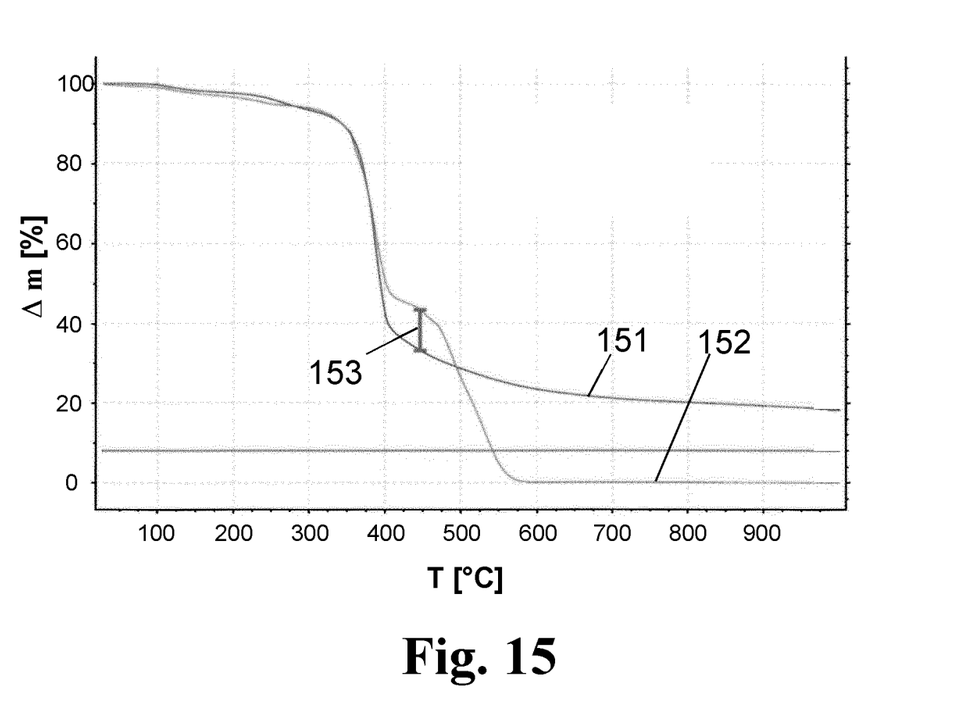
FIG. 15 shows the result of a thermogravimetric analysis (TGA) of a specific precursor material heated up to 1000° C. in both argon and in synthetic air.

FIG. 15 shows the result of a thermogravimetric analysis (TGA) carried out with a mixture of Alnovol PN320 with the Genapol® PF20 Synperonic PE/L64 with the ratio of 5:5, where said mixture was separately heated up to 1000° C. in both argon (curve 151) and synthetic air (curve 152) atmospheres. Similar as in FIG. 1, the remaining mass compared to the original sample mass Δm (in %) of the sample is plotted on the ordinate as a function of the heating temperature T (in ° C.). The heating temperature is a function of the heating rate which is 3° C./min until a temperature of 600° C. is reached and 5° C./min until the end temperature of 1000° C. Until about 400° C. the TGA curves 151, 152 of the samples heated in different atmospheres have rather similar profiles. At 400° C. the argon pyrolyzed sample (151) shows a larger mass loss and its slope decreases afterwards. The air pyrolyzed sample (152) has a plateau in the temperature range from about 400 to 450° C., where the mass loss of carbon is about 10 wt. % lower than the mass loss of the argon pyrolyzed sample (151). The mass loss however strongly increases when oxidation takes place at temperatures higher than 450° C. The difference in the carbon yields at 450° C. is indicated by the distance bar 153.

Similar thermogravimetric analysis results were revealed for a precursor material made from Alnovol® PN445 and Genapol® PF20 (5:5) mixture. At a temperature of 450° C., the mass loss of the sample crosslinked in argon atmosphere was almost 15 wt. % larger compared to the sample crosslinked in synthetic air.

Based on these thermogravimetric results, an experiment was designed to prove that the increase of the carbon yield (the reduction of the carbon mass loss) during the pyrolysis can be transferred to the synthesis of the porous carbon material by the process of the invention. A mixture of Alnovol® PN320 and Genapor® PF20 with the ratio of 5:5 was crosslinked and pyrolyzed up to 600° C. with the following heating ramp profile: 20-350° C.: on average 0.5° C./min→350-450° C.: 1° C./min→450-600° C.: 2° C./min. At a temperature of 450° C. the decomposition of the amphiphile is sufficiently complete and the atmosphere is changed from containing the oxidizing agent to one with inert gas only. This temperature (450° C.) is at the same time the maximal temperature of the oxidation phase in which the precursor material is heated in an atmosphere containing an oxidizing agent and the "first temperature" of the low temperature treatment.

In the first trial the mixture was pyrolyzed in nitrogen atmosphere. In the second trial the mixture was heated in an open retort in order to ensure an atmosphere containing an oxidizing agent (air) during pyrolysis until 450° C. As soon as that temperature was reached, the retort was closed, and the nitrogen flow was turned on in order to protect the carbonaceous material from further oxidation by air at higher temperatures (450-600° C.). Table 3 shows a comparison of the yields of the porous carbon material after the pyrolysis in nitrogen and in air (until 450° C.).

TABLE 3

| Atmosphere | Precursor mixture | Yield at 600° C. in % | Yield at 900° C. in % |
| --- | --- | --- | --- |
| Nitrogen | Alnovol ® PN320 Genapol ® PF20 | 30.3 | 26.3 |
| Air until 450° C. (and afterwards N$_2$) | Alnovol ® PN320 Genapol ® PF20 | 32.7 | 29.7 |

The sample treated in nitrogen has a yield of 30.3 wt. % at 600° C., while the air crosslinked sample has a higher yield of 32.7 wt. %. The statistical error of the yield is typically 0.5 wt. %. In fact, the yield of the carbonized air crosslinked sample is 3.4 wt. % larger compared to the nitrogen crosslinked sample. This improvement is even larger than the yield gain of 2.4 wt. % found at 600° C. This implies that oxygen stabilizes the polymeric network and this improvement can be preserved. In this first experiment the air was replaced by nitrogen at a temperature of 470° C. By other experiments it could be shown that even a higher carbon yield might be obtained by process optimization, e.g. by switching to an inert atmosphere at a temperature of 400° C. and lower. The crosslinking and pyrolysis result in a macroporous carbon material.

The crosslinking and pyrolysis of the precursor material mixtures result in a macroporous carbon with a cumulative pore volume above 0.4 cm$^3$/g and with a modal pore size in the range between 50-280 nm.

The invention claimed is:
1. A process for preparing a porous carbon material comprising the steps:
   a) providing at least one carbon source and at least one amphiphilic species,
   b) combining the carbon source and the amphiphilic species to obtain a precursor material, and
   c) heating the precursor material to obtain the porous carbon material having a modal pore size and a pore volume,
   wherein the heating step c) comprises a low temperature treatment in which the precursor material is heated to a first temperature in the range between 300° C. and 500° C. to obtain a self-assembled porous carbonaceous material, and wherein heating to the first temperature comprises a first average heating rate in the range of 0.5° C./min to 5° C./min, and wherein the low temperature treatment comprises a temperature dwell time of 15 to 240 minutes at a holding temperature lower than the first temperature.
2. The process according to claim 1, wherein the first average heating rate is set to a value in the range 0.6 to 2.5° C./min.

3. The process according to claim 1, wherein the first average heating rate is set in dependence of a pre-determined modal pore size and a pre-determined pore volume of the porous carbon material,
wherein setting the average heating rate comprises a step of establishing a calibration curve to the dependency of the pore size and/or the pore volume on the average heating rate.

4. The process according to claim 1, wherein heating according to step c) is started within 1 hour of the combining step b).

5. The process according to claim 1, wherein the holding temperature is less than 450° C. and the dwell time is in the range of from 15 to 60 min.

6. The process according to claim 1, characterized in that the heating of the precursor material in heating step c) comprises an oxidation phase in which the precursor material is treated in an atmosphere containing an oxidizing agent.

7. The process according to claim 6, characterized in that the atmosphere containing an oxidizing agent during heating the precursor material during the oxidation phase is an atmosphere containing oxygen in molecular form.

8. The process according to claim 7, characterized in that the heating of the precursor material during the oxidation phase is carried out in a temperature range between 150° C. and 520° C.

9. The process according to claim 8, characterized in that the oxidation phase has a duration in the range of 60 to 360 minutes.

10. The process according to claim 1, wherein the heating step c) comprises a high temperature treatment, during which the self-assembled porous carbonaceous material is subjected to a second temperature of at least 700° C. and not more than 3000° C.

11. The process according to claim 1, wherein the precursor material is such that when subjected to a low temperature treatment at an average heating rate of 5° C./min it has more than twice the modal pore size than at an average heating rate of 2° C./min.

12. The process according to claim 1, wherein the amphiphilic species comprising a first amphiphilic compound, the first amphiphilic compound comprising two or more adjacent ethylene oxide based repeating units.

13. The process according to claim 1, wherein the precursor material comprises a block copolymer of propylene oxide and ethylene oxide, containing 15 wt. % to 25 wt. % ethylene oxide.

14. The process according to claim 1, wherein the precursor material comprises a surfactant containing 50 to 80 wt. % of ethylene oxide.

15. The process according to claim 1, wherein the carbon source is selected from the group consisting of phenolic-formaldehyde resins, hydrolysable tannic acid, lignin, and cellulose resins.

16. The process according to claim 1, wherein the precursor material is free of solvents.

\* \* \* \* \*